Nov. 11, 1958     H. H. MACKAL     2,859,932
VALVE
Filed Oct. 15, 1954     2 Sheets-Sheet 1
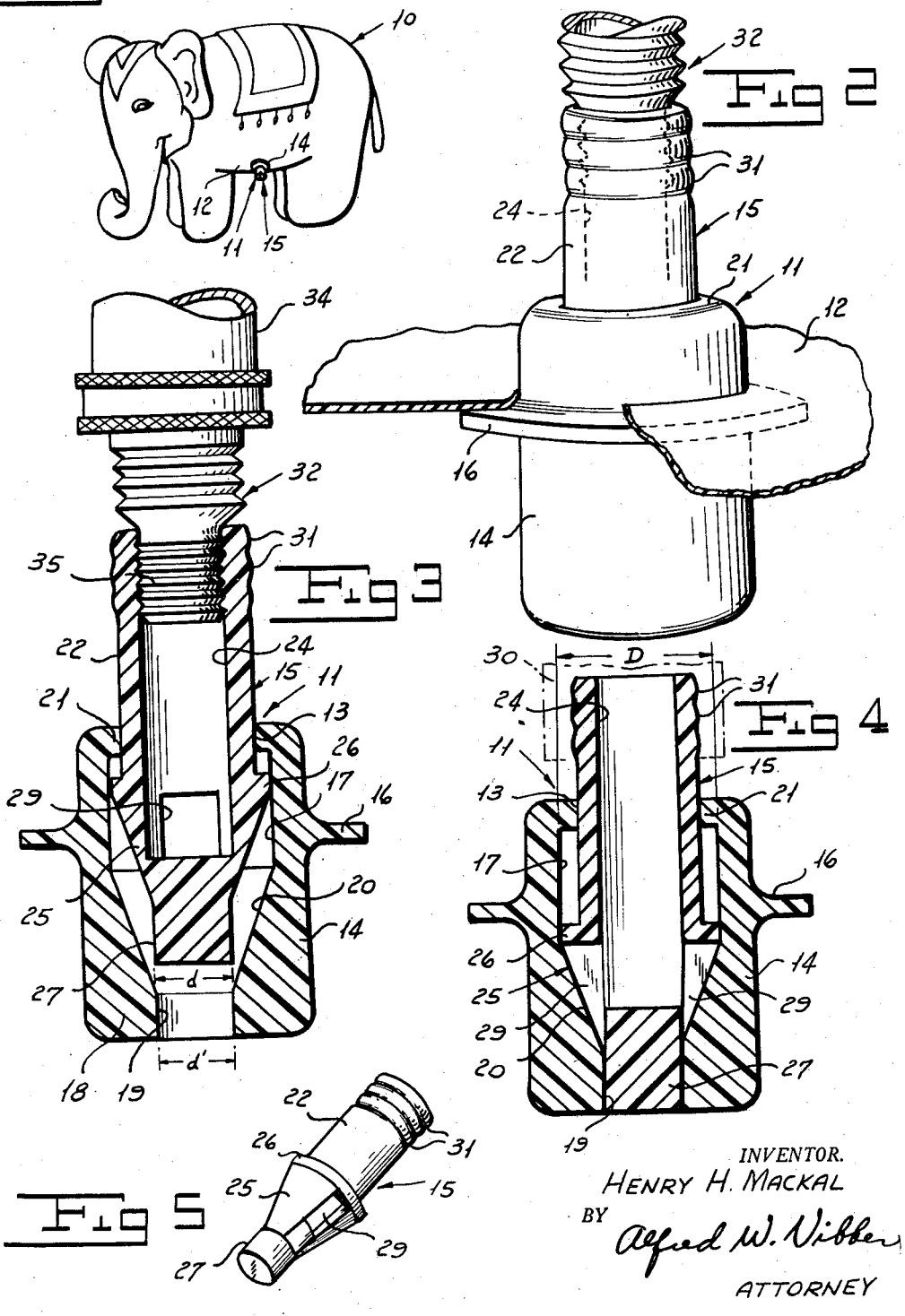
INVENTOR.
HENRY H. MACKAL
BY Alfred W. Vibber
ATTORNEY

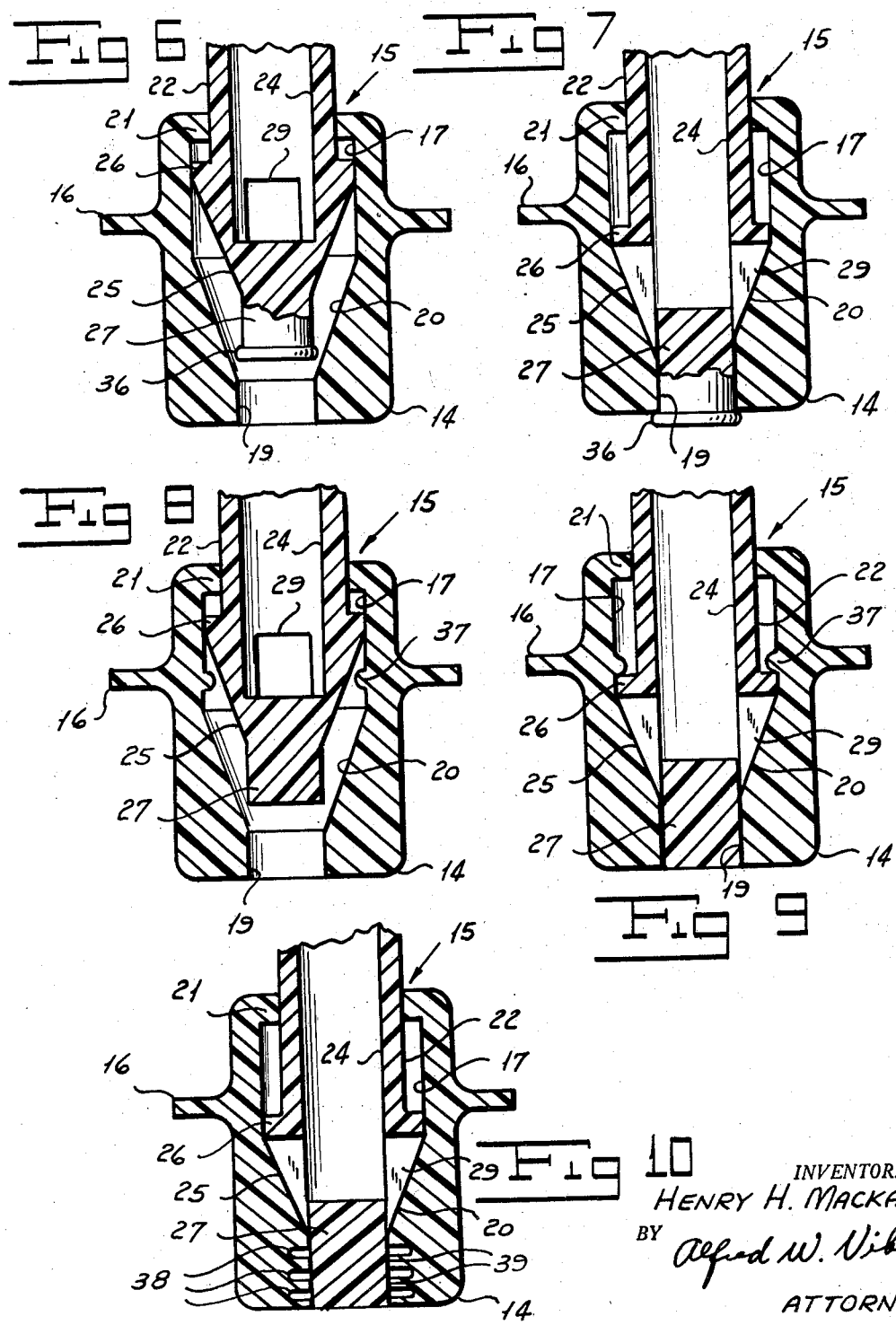

United States Patent Office 2,859,932
Patented Nov. 11, 1958

2,859,932

VALVE

Henry H. Mackal, Paramus, N. J.

Application October 15, 1954, Serial No. 462,562

9 Claims. (Cl. 251—347)

This invention relates to a valve for transmitting fluid into or out of fluid-containing articles and for checking the passage of such fluid.

The valve of the invention, as will be appreciated from the following description of preferred embodiments thereof, is capable of use to advantage in a wide variety of applications and under widely differing conditions. A typical application is that as a gas admitting and retaining valve on user-inflated articles, to be described in detail hereinafter. Is is to be understood, however, that the valve of the invention displays marked advantages in other uses, such as to allow the exhaustion of gas from a container and the subsequent sealing of the container from the ingress of further gas, and in allowing the admission of a liquid into a hollow article, or the exhaustion of liquid from the article, and the subsequent sealing of the article. The valve is of advantage in all its manners of application because of its simplicity, its ease of operation, its durability, and its resistance to attack by corrosive liquids and gases.

As above indicated, the valve of the invention is capable of use to advantage to admit gas to, to retain such gas in, and to exhaust it from gas-inflated hollow articles. User-inflated hollow articles wherein the gas, such as air, is held under pressure ordinarily are provided with a valve sealed thereto through which the article may be inflated and deflated as desired. Typical of such inflated articles are invalid rings, beach balls, air mattresses, wading pools, and punching toys. Such articles, if of relatively small volume, are usually mouth inflated although in some instances where the gas volume is large it is preferable to inflate them by hand pumps or from a supply of compressed air, such as that at a filling station.

Previously used valves for this purpose have usually been made of metal. Some prior valves have an outer metal body member in which there is threadedly mounted a movable hollow valve element having a seat forming washer affixed to its inner end. Such valve is opened by turning the inner member to retract the washer from the seat, after which the article may be inflated by introducing gas under pressure through the hollow stem of the inner element. To close the valve the inner member is rotated to bring the washer into sealing engagement with the seat. When the wall of the inflated article is made of thin plastic material it is most usual to provide a plastic sheath member tightly engaging the metal body of the valve, such sheath member, in turn, being sealed to the plastic wall of the article.

The described prior valves are durable and provide a satisfactory seal against escape of the gas, but they are relatively expensive to produce because of the machining and assembling operations required, and are relatively time consuming to open and close because of the rotation of the inner valve element required. Further, the metal valve is rigid and unyielding so that if one steps upon the valve containing zone of the article, particularly when the article is wholly or partially deflated, the valve is prone to puncture the wall of the article. This is quite likely to happen in toys of the punching type used by children. Also, the exposed metal stem of the described prior valves frequently scratches the floor and furniture when the article is carelessly bounced around in the house. When articles provided with the described prior valves remain packed and folded for long periods the edge of the metal portion or portions of the valves may remain pressed against a portion of the side wall of the article for a long time so as to tend to deform and weaken it.

The valve of the present invention is of simplified construction so that its parts may be molded to final shape and so that but one simple assembly operation is required to complete the valve. In preferred embodiments of the valve of the invention the body of the valve may be directly electronically sealed to the body of the hollow article. The valve is easily opened and closed by reciprocation of the movable valve element, and is open when such element is in its outer position and is closed when the element is in its inner position, so that pushing or punching the valve from the outside of the article tends to close the valve more tightly. Both the outer body portion of the valve and the inner reciprocable element thereof are preferably made of elastic plastic material so that the valve does not tend to cut or seal to the opposite wall of the inflatable article when pressed against it for long periods of time, does not tend to puncture the article even though the valve should be stepped on and pressed against the opposite side of the article, and does not scratch the floor or furniture.

The valve of the present invention is provide with an outer hollow valve body having a central opening longitudinally thereof, and an inner valve element mounted to reciprocate in the valve body longitudinally thereof between an outer, valve-open position and an inner, valve-closed position. Preferably the valve body and the valve element are both molded of elastic plastic material. The construction of the valve body and valve element is such that they may be assembled by pressing the element longitudinally into the body, thereby temporarily deforming them, the parts then resuming their normal relaxed shape in which they are prevented from fortuitous separation. The valve element has an outer cylindrical stem with a longitudinal passage therein projecting outwardly of the body. The valve body and the valve element provide an open path including the passage in the stem of the element when the element is in valve-open position, movement of the valve element into its inner, valve-closed position effectively sealing such path.

The invention has among its objects the provision of an improved, simplified, easily made and operated fluid transmitting and checking valve, the provision of such valve in which, in a preferred embodiment, all parts are threadless and are made of elastic plastic material, and the provision of a valve of the above character in which the parts may be assembled manually and in which the body of the valve may be directly sealed to the wall of the hollow article.

Further objects of the invention, in preferred embodiments thereof, reside in the provision of a two-part valve, the parts of which are molded to finished shape, and in the provision of a positive-acting valve which is opened and closed by a simple straight line motion, the valve being closed when the movable element is in its inner position and opened when the movable element is in its outer position.

The above and further objects of the invention relating to economies of manufacture, assembly, and use, will become apparent in the following specification.

My invention is clearly defined in the appended claims. Where parts are, for clarity and convenience, referred to on the basis of their oriented position shown in the accompanying drawing, no limitation as to positioning of the entire structure is to be implied, since it will be understood that the entire structure may be inverted or that it may be used in any inclined position. Also in both the description and the claims, parts at times may be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawing forming part of this specification, in which:

Fig. 1 is a view in perspective, on a reduced scale, of an air-inflated punching toy incorporating a first embodiment of the valve of the invention.

Fig. 2 is an enlarged view in side elevation of the first embodiment of the valve, a portion of the wall of the air-inflated article to which the valve is attached being broken away, one form of air-delivering fitting being shown attached to the stem of the movable element of the valve.

Fig. 3 is a view in vertical axial section through the valve of Figs. 1 and 2 with the valve in an intermediate, partially open position, the air delivering fitting attached to the stem being shown in side elevation.

Fig. 4 is a view in vertical axial section through the valve of Figs. 1, 2, and 3 in closed position, the section being taken substantially at right angles to that of Fig. 3, a second type of air-delivery fitting being shown attached to the stem.

Fig. 5 is a view in perspective of the movable inner element of the first embodiment of the valve of the invention.

Fig. 6 is a fragmentary view in vertical axial section through a second embodiment of the valve with the inner, movable element of the valve in an intermediate, partially open position.

Fig. 7 is a view similar to Fig. 6 but with the inner, movable valve element in closed position.

Fig. 8 is a fragmentary view in vertical axial section through a third embodiment of the valve with the inner, movable element of the valve in open position intermediate its fully closed and its fully open positions.

Fig. 9 is a view similar to Fig. 8 but with the movable valve element in closed position.

Fig. 10 is a fragmentary view in vertical axial section through a fourth embodiment of the valve with the movable element therein in valve closed position.

As is evident from the above, there are shown and described herein four embodiments of the valve of the invention, as follows: I. Figs. 1–5, inclusive, II. Figs. 6 and 7, III. Figs. 8 and 9, and IV. Fig. 10.

In Fig. 1 there is shown a typical punching toy 10, in the form of an elephant, provided with a first embodiment of the valve of the invention, generally designated 11, in accordance with the invention. As more clearly apparent in Fig. 2, the outer body 14 of the valve is attached to the side wall 12 of the toy through the medium of the flange 16 on the valve body sealed to the wall. The valve has an inner valve element generally designated 15, which is reciprocable longitudinally of the body 14 from an inner, valve-closed position to an outer, valve-open position. As will be apparent hereinafter, the valve is open throughout a zone of appreciable length at the outer end of the travel of the element 15 and is closed throughout a zone of appreciable length at the inner end of the travel of element 15. Element 15 is shown in Figs. 2 and 3 as lying in a "valve-open" position, but with the stem of the element not fully extended from body 14.

The body 14 in the embodiment shown is made as a circular cylindrical body having the outwardly radially directed transverse attaching flange 16 thereon. Body 14 has a central opening extending axially therethrough, the opening being in the shape of a body of revolution. Such opening is made up of a central cylindrical opening 13 through the first, upper and outer (with respect to the side wall of the article 10) flange 21, an enlarged, circular cylindrical bore 17 inwardly of the first flange, the inwardly converging frusto-conical seat 20 and the central opening 19 through the second inner flange 18 in the body 14. As shown, the larger end of seat 20 is of the same diameter as the lower end of bore 17, and thus merges therewith, and the smaller end of seat 20 is of the same diameter as the circular cylindrical opening 19, and thus merges with such opening.

The inner movable valve element 15 has an elongated hollow stem 22 which has sealing but sliding contact with the wall of the opening 13 through flange 21. Stem 22 has a central longitudinal passage 24 extending from the outer end of the stem to a location intermediate the ends of the enlarged frusto-conical intermediate portion 25 of the element which lies within the body 14. Portion 25 has a shape and orientation substantially identical with seat 20, so that when element 15 is fully advanced into body 14 the surfaces of portion 25 and seat 20 have mating sealing engagement with each other as shown in Fig. 4. The outer larger diametered end of portion 25 merges with the circular cylindrical shoulder 26 which has sliding substantially sealing contact with the wall of bore 17.

Immediately inwardly beyond the smaller diametered end of intermediate portion 25 and merging therewith is the circular cylindrical plug-like member 27 which may have a diameter the same as, or preferably may be slightly larger than, the smaller end of frusto-conical portion 25, and which, when element 15 is advanced into bore 14, enters and closes the opening 19 in the second flange 18 of the valve body. The inner end of member 27 is guided into opening 19 by the inner, smaller end of seat 20. Two laterally directed oppositely located passages 29 extend inwardly from the surface of intermediate portion 25 to the central opening 24 through the stem of the movable valve element, thereby providing a path through the valve by way of the longitudinal passage 24 in the stem, the lateral passages 29, and the opening 19 when the valve element is in an outer open position such as shown in Fig. 3. Leakage of air from the inflated article outwardly to the atmosphere, when the valve is in such position, is prevented by the substantial seal between shoulder 26 and bore 17, and the seal between the outer surface of stem 22 and the opening 13 through the flange 21. When part 27 of the movable valve element has entered opening 19 to an appreciable extent, the leakage of air through the valve is normally prevented. When the valve element 15 is fully advanced into the valve body 24 leakage of air from the inflated article outwardly through passage 22 to the atmosphere is prevented by the sealing engagement between the plug 27 and the opening 19. Leakage of air from the article outwardly through the valve along the stem 15 is prevented, as before, by engagement of shoulder 26 and stem 15 with their confronting guiding surfaces 17 and the wall of the opening through flange 21, respectively.

The movable valve element 15 preferably has the outer end of its stem so constructed that it may be selectively engaged with at least two different types of air delivering fittings as well as being engageable by the mouth. The diameter of passage 24 in the stem in the embodiment shown is made such as to receive the smaller threaded end 35 of a conventional two-diametered male fitting 32 attached to an air delivering hose 34 as shown in Figs. 2 and 3. The initially smooth inner wall of the stem is of such character that it is temporarily threadedly embossed when the end 35 of fitting 32 is screwed thereinto. The outer end of the stem is also preferably provided with spaced transverse rounded ridges so that the stem may readily be threadedly engaged with the conventional female type air delivering connector 30, shown in Fig. 4, usually employed on automobile tire pumps.

Although it is to be understood that the invention is not restricted thereto, both the body 14 and the movable element 15 in a preferred embodiment of the valve are molded from polyvinyl chloride which is relatively soft and elastic but is sufficiently stiff to be self-sustaining. Other suitable elastic plastic materials may, of course, be used for making the valve parts. The use of polyvinyl chloride is of advantage when the wall 12 of the air-inflated article is also made of polyvinyl chloride, since the flange 16 of the valve body may then readily be heat sealed thereto by the use of conventional high frequency electronic sealing apparatus.

By way of illustration of a satisfactory valve made in accordance with the invention but not by way of limitation, there are given the following dimensions. In their relaxed states the diameter $d$ of the plug-like member 27 somewhat exceeds the diameter $d'$ of the opening 19 in the inner flange 18. Typical relaxed dimensions of such parts are: $d$ equals .178 inch and $d'$ equals .170 inch. The relaxed diameter of bore 17, in the illustrative embodiment, equals the relaxed diameter of the shoulder 26. The relaxed diameter of the central opening through flange 21 is slightly less than the relaxed outer diameter of the stem 22 of the movable element, the opening in flange 21 having a relaxed diameter of .291 inch and the relaxed diameter of the opening in flange 21 being .287 inch. Shoulder 26 on the movable valve element of the illustrative embodiment has a relaxed diameter of .357 inch. The frictional engagement of the parts in valve-closed position is more than sufficient to hold the movable valve element tightly against the air pressure within the inflated article 10.

Because of the yieldability of the body 14 and the movable element 15 of the valve, the separately molded body and element may be assembled simply by inserting the frusto-conical portion 25 on the element into the opening in flange 21 of the body and pressing the element inwardly of the body. The frusto-conical portion 25 progressively enlarges the opening in flange 21 sufficiently for shoulder 26 to snap downwardly past flange 21, after which the parts resume the relaxed state shown in Fig. 3. The valve element may be removed from the valve body, if it is necessary to clean the valve, by pulling the element outwardly of the body. Although this requires more effort than the described assembly of the parts, it may be accomplished without too much difficulty, since the upper edge of the shoulder 26 may be worked progressively up past the chamfered inner edge of flange 21, so that the element is eventually freed from the body without damage to either. Foreign material may then be easily removed from both parts of the valve, after which the valve may be reassembled.

Although the valve of Figs. 1–5, inclusive, has been described in connection with a gas-inflated hollow article, it will be understood that it may be used to advantage with hollow articles from which gas is exhausted. As an example, quilts are sometimes placed in plastic envelopes from which the air is extracted in order to reduce the overall size of the package. The valve of the invention may be employed on such envelope, being connected to a vacuum line to exhaust the envelope, after which the valve is closed and then disconnected from the line. The excess of atmospheric pressure over that acting upon the inner end of member 27 in this application of the valve, tends constantly to urge the inner, movable element of the valve into valve-closed position.

The embodiments of the valve shown in II. Figs. 6 and 7, III. Figs. 8 and 9, and IV. Fig. 10 are of advantage in applications wherein somewhat more positive holding of the movable valve element in valve-closed position is required. In such figures, the same reference characters as in Figs. 1–5, inclusive, are employed to designate parts which are the same as in the previously described first embodiment of the valve.

In the valve of Figs. 6 and 7 an enlarged end or flange 36 integral with plug member 27 is provided on the bottom end thereof. Flange 36, which is of relatively small height, has a diameter somewhat exceeding the diameter of the main body of plug 27, but insufficient to require undue force in deforming it radially to allow it to pass into and through bore 19 of valve body 14 as the movable valve element is moved from the open position of Fig. 6 to the closed position of Fig. 7. A typical flange 36 found to be satisfactory has a radial height of .02 inch. The flange 36 is preferably so located on plug 27 that, when the movable valve element is fully advanced into the outer valve body, the flange snaps outwardly of the bore 19 of the body and tightly engages the bottom surface of the body. The flange prevents fortuitous withdrawal of the movable valve element 15, and thus undesired opening of the valve, without adding unduly to the force required to open the valve when desired. The pressure of gas acting upon the lower end of plug 27, and thus flange 36, when the valve is closed, tends to thrust flange 36 sealingly into contact with the bottom end of body 18.

In the valve of Figs. 8 and 9 there is provided means whereby the inner movable valve element is held against accidental displacement from its outer, valve-open, and its inner, valve-closed positions. Projecting inwardly from the wall of the bore 17 is the shallow annular rib 37 which is so positioned that shoulder 26 of element 15 lies above it when the element is in raised, valve-open, position (Fig. 8), and the shoulder lies below it when the element is in lowered, valve-closed, position (Fig. 9). Preferably the rib 37 contacts or substantially contacts the shoulder 26 when the valve element 15 is fully lowered. Rib 37, which is integral with body 14 of the valve, is of such radial height that it imposes a marked retardation on the element 15 as shoulder 26 thereon passes by the rib, thereby tending to prevent unwanted displacement of the element 15 without, however, adding unduly to the force required to move element 15 from its open to its closed position and vice versa.

The fourth embodiment of the valve of the invention, shown in Fig. 10, provides an improved sealing means at the cylindrical lower end 27 of the movable valve element. In this embodiment the wall of the bore at the lower end of the valve body 14, rather than being of unbroken circular cylindrical configuration as in the previously described embodiments, is provided with a series of spaced annular grooves 38 defining lands 39 therebetween. The inner annular surfaces of lands 39 are preferably made of a diameter somewhat less than the diameter of the plug 27, so that as the movable valve element 15 is thrust downwardly into valve-closed position the inner edges of the lands are pressed downwardly somewhat as the plug passes through them.

When the inner end of the closed valve is subjected to fluid presure, the pressure tends to urge the lands 39 upwardly toward their normal, relaxed horizontal position, and in so doing causes the lands to engage the plug 27 still more tightly. The embodiment of Fig. 10 is, therefore, like those of Figs. 6 and 7 and of Figs. 8 and 9, particularly of advantage in applications wherein the valve must sustain appreciable pressures.

Although the valve of the invention has been described primarily in applications wherein it admits, exhausts, and prevents the passage of gases, it is to be understood that it also may be employed in applications where it is in contact with and/or seals against the passage of liquids. In its preferred embodiments wherein both parts of the valve are molded of plastic material as recited, the valve is particularly of value for use where it comes into contact with corrosive media. Thus, the valve may be used for long periods while submerged in or in contact with sea water without any deterioration of the valve parts.

I claim:

1. A two-piece valve comprising: an outer hollow valve body having a central opening longitudinally therethrough, a centrally-open relatively thin radially inwardly extending first flange on the outer end of the valve body, a centrally-open relatively thick radially inwardly extending second flange on the inner end of the valve body, the diameter of the opening in the first flange somewhat exceeding that of the opening in the second flange, an inner valve element mounted to reciprocate in the valve body longitudinally thereof between an outer, valve-open position and an inner, valve-closed position, the valve body and the valve element being molded of elastic plastic material, the element having an outer cylindrical stem with a longitudinal passage therein, the stem projecting outwardly through the first flange and having sealing sliding contact therewith, the opening in the valve body having an inwardly converging frusto-conical seat at its forward end and a circular cylindrical portion rearwardly thereof, the inner, smaller end of the seat merging with the opening in the second flange, an inwardly converging frusto-conical intermediate portion shaped similarly to the seat on the stem inwardly of the valve body, the larger end of the intermediate portion having a diameter materially exceeding that of the stem and slidingly and substantially sealingly engaging the circular cylindrical portion of the opening in the valve body, a cylindrical plug on the inner end of the element beyond the smaller end of the intermediate portion selectively entering and closing the opening in the second flange, the plug having a relaxed diameter somewhat exceeding the relaxed diameter in the opening in the second flange, and a second, transverse passage in the element through an intermediate portion of the frusto-conical intermediate portion thereof connecting the passage in the stem with the opening in the valve body when the element is in valve-open position, the body and element being so constructed that when the plug is fully engaged in the opening in the second flange the intermediate portion on the element is engaged with the seat in the body.

2. A two-piece valve comprising: an outer hollow valve body molded of elastic plastic material and having a central opening longitudinally therethrough, a centrally open inwardly extending relatively thin first flange on the outer end of the body and a centrally open inwardly extending relatively thick second flange on the inner end of the body, an inner valve element molded of elastic plastic material mounted to reciprocate in the valve body longitudinally thereof between an outer, valve-open position and an inner, valve-closed position, the element having an outer cylindrical stem with a longitudinal passage therein, the stem projecting outwardly through the first flange and having sealing sliding contact with such flange, an enlarged intermediate portion on the stem inwardly of the valve body engaging the opening in the body to form a guide for the element, the inner end of the enlarged intermediate portion of the valve element being frusto-conical and converging in a direction inwardly of the valve body, the first flange being deformable by the frusto-conical enlarged portion on the valve element to allow entry of the valve element into the body upon assembly of the parts but functioning normally with the enlarged portion as a stop against the withdrawal of the valve element from the valve body, a plug on the inner end of the element selectively entering and closing the opening in the second flange, a forward portion of the inner wall of the valve body being of a frusto-conical shape similar to that of the inner end of the enlarged portion of the valve element, the valve body and valve element being so constructed and arranged that when the plug is fully entered into the opening in the second flange the frusto-conical portion of the enlarged portion on the valve element is engaged in the frusto-conical seat on the body, and a generally transverse passage in the frusto-conical portion of the enlarged portion on the valve element connecting the longitudinal passage in the stem with the opening in the valve body inwardly of the largest diameter of the enlarged portion on the valve element when the element is in valve-open position.

3. A two-piece valve, one piece being an outer hollow valve body comprising a central opening longitudinally therethrough, a centrally-open radially inwardly extending first flange on the outer end of the valve body, a centrally-open relatively thick radially inwardly extending second flange on the inner end of the valve body, the diameter of the opening in the first flange somewhat exceeding that of the opening in the second flange, the other piece being an inner valve element mounted to reciprocate in the valve body longitudinally thereof between an outer, valve-open position and an inner, valve-closed position, at least one of said two pieces being made of elastic plastic material, the inner valve element comprising an outer cylindrical stem with a longitudinal passage therein, the stem projecting outwardly through the first flange and having sliding contact therewith, the flange forming a first guide for the valve element, the opening in the valve body having a radially inwardly extending seat at its forward end and a cylindrical portion rearwardly thereof, an inwardly converging frusto-conical enlarged intermediate portion on the stem inwardly of the valve body, the larger end of the frusto-conical intermediate portion slidingly engaging the circular cylindrical portion of the opening in the valve body and forming a second guide for the valve element, at least one of the two valve element guides functioning substantially to form a seal between the valve element and the valve body, a cylindrical plug on the inner end of the element beyond the smaller end of the frusto-conical intermediate portion, said plug entering and closing the opening in the second flange when the valve element is moved to its inner position, the plug having a relaxed diameter somewhat exceeding the relaxed diameter of the opening in the second flange, and a second passage in the valve element connecting the passage in the stem with the opening in the valve body, said passage communicating with the opening in the second flange when the element is in valve-open position, the body and the element being so constructed and arranged that when the frusto-conical intermediate portion on the element is engaged with the seat in the body the plug is received in and seals the opening in the second flange.

4. The valve as defined in claim 3, wherein the valve body is made of elastic plastic material, and the valve element may be assembled within the valve body by advancing the valve element longitudinally into the body so as temporarily to deform the first flange by the enlarged intermediate portion of the valve element until the first flange snaps inwardly past such enlarged portion.

5. The valve as defined in claim 3 wherein the valve body and the valve element are both made of elastic plastic material.

6. The valve as defined in claim 4 wherein the seat in the valve body has a frusto-conical inwardly converging shape similar to that of the enlarged portion on the stem of the valve element.

7. The valve defined in claim 6 wherein the second passage extends through the frusto-conical part of the enlarged portion on the valve element and generally transversely of the longitudinal passage through the stem of the valve element.

8. The valve defined in claim 7 wherein the inner end of the frusto-conical seat in the valve body merges smoothly with the outer end of the passage through the second flange in the valve body.

9. The valve as defined in claim 6 wherein the enlarged intermediate portion on the valve element has a cylindrical zone outwardly of the larger end of the frusto-conical portion thereon, said cylindrical zone slidingly engaging the cylindrical portion of the valve body.

References Cited in the file of this patent

UNITED STATES PATENTS

| | | |
|---|---|---|
| 1,423,418 | Grikscheit | July 18, 1922 |
| 1,981,720 | Crane | Nov. 20, 1934 |
| 2,675,204 | Johnson | Apr. 13, 1954 |
| 2,693,203 | Hempel | Nov. 2, 1954 |

FOREIGN PATENTS

| | | |
|---|---|---|
| 59,843 | Norway | of 1938 |
| 893,347 | France | June 6, 1944 |